United States Patent [19]
Kovarik

[11] 3,875,051
[45] Apr. 1, 1975

[54] SEWAGE TREATMENT SYSTEM

[76] Inventor: Vincent J. Kovarik, Highway 21, Imperial, Mo. 63052

[22] Filed: Mar. 22, 1973

[21] Appl. No.: 343,946

[52] U.S. Cl. .................. 210/2, 210/104, 210/117, 210/170
[51] Int. Cl. .............................................. C02c 1/02
[58] Field of Search ........... 210/2, 16, 97, 104, 117, 210/170, 199, 201, 252, 256, 259, 532, 152, 86

[56] References Cited
UNITED STATES PATENTS

| | | | |
|---|---|---|---|
| 1,917,805 | 7/1933 | McManus | 210/117 |
| 2,938,630 | 5/1960 | Novak | 210/15 X |
| 3,029,950 | 4/1962 | Frasca | 210/256 |
| 3,126,333 | 3/1964 | Williams | 210/256 X |
| 3,210,053 | 10/1965 | Boester | 210/220 X |
| 3,211,167 | 10/1965 | Clift et al. | 210/170 X |
| 3,306,447 | 2/1967 | Medeiros | 210/170 X |
| 3,332,552 | 7/1967 | Zabel | 210/86 |
| 3,335,082 | 8/1967 | Ullrich | 210/199 X |
| 3,563,382 | 2/1971 | Regent | 210/104 |
| 3,730,884 | 5/1973 | Burns et al. | 210/170 X |

Primary Examiner—Charles N. Hart
Assistant Examiner—Robert H. Spitzer
Attorney, Agent, or Firm—Klamen, Summers & Compton

[57] ABSTRACT

A sewage treatment system utilizing aerobic and anaerobic treatment. Anaerobic treatment of organic solids is utilized in a primary settling tank located at or near each sewage source which would also trap non-degradable solids. Liquid effluent from the settling tank is collected in a wet well storage which is either a intergral part of the settling tank or a separate container. The liquid is then intermittently pumped from the wet well by an inexpensive non grinder pump through pressure regulated lines to a central aerobic treatment plant for purification of the liquid effluent.

4 Claims, 4 Drawing Figures

SEWAGE TREATMENT SYSTEM

SUMMARY OF THE INVENTION

This invention relates to a new and unique concept of collecting and treating sewage and is particularly applicable to areas where natural outcroppings of rock, sparsely developed ridge hill lands, flat lands and high ground water table areas make conventional gravity sewers prohibitively expensive. This system is also uniquely appropriate in recreational developments with lots surrounding bodies of water. The type of soil which is conducive to formation of lakes is naturally nonporous so as to contain the body of water comprising the lake and has a very low rate of percolation. The low rate of percolation makes the use of septic tanks or privy vaults, traditionally used in non urban areas unacceptable as liquid effluent cannot percolate through the septic tank absorption fields. Thus, when septic tanks have been used in such areas, the lake is rapidly polluted by the untreated effluent from the absorption fields or where no lake is involved, untreated effluent collects on the ground surface above the absorption fields because of the impervious nature of the soil.

With the advent of more severe water pollution control regulations, even where absorption fields are practical, the discharge of septic effluent into subsurface streams has come under increasing criticism in recent years by state regulatory agencies.

The major problem is not the treatment and disposal of biodegradable solids which by volume comprise only a small portion of the sewage but the treatment and disposal of water which after being exposed to and intermixed with the solids, becomes contaminated. Systems which prolong the intermixture of the solids with the water compound the treatment problem as well as serving as an excellent vehicle for multiplication of bacteria. In addition, systems which intermix the water and solids increase the bulk and make the means of conveyance unnecessarily expensive. Special filters have been proposed, but they too are expensive and require frequent maintenance.

Recently, a solution to some of the above enumerated problems has been proposed and utilized by sanitation engineers. This involves the utilization of a pump which grinds or macerates the sewage. The pump takes the sewage effluent from a residence or other sewage source and grinds it or reduces solids to a particle size of approximately ½ inch or less and then pumps the resulting slurry through pressurized lines to a central treatment plant. This method does reduce somewhat the size of the collection lines to the central treatment plant but does not reduce the bacteriological treatment load on the central treatment plant. In addition, while the cost of the collection lines may be lowered over a gravity flow system, this type of pump is of necessity very expensive to construct and also subject to fouling or clogging.

Quite often individuals will discharge nonbiodegradable items accidentally into their sewage systems. A child may drop a small metallic toy into a toilet, cloth, plastic, wood, rubber, bits of steel, etc., all may be discharged along with organic waste into a sewage collection pipe. To alleviate this problem of clogging as well as the problem of corrosion from sewage gases, since the grinder pump is operated in or near the effluent to draw the solids into the grinder, various manufacturers have had to resort to very expensive materials of construction to obtain the corrosion resistance and ability to grind the solids which may accidentally enter the system. Even with sophisticated materials, such a system is still subject to clogging or jamming, and its long term integrity may be questionable as this type of system has not been in use long enough to demonstrate its reliability.

Aeration units have also been recently introduced as an expensive alternative for residential treatment, treating waste with bacteria requiring constant oxygenation. Such units do not resolve the problem of disposal of the liquid effluent. The quality of the effluent discharged by one of these plants is improved over that of a septic tank, but it still is not of a quality which should be openly discharged and unless adequate drainage exists, the effluent may collect on the property in areas of impervious soils.

The invention described herein eliminates all of the disadvantages of the previously described systems and also effectively treats the effluent while being the least expensive of all systems to install initially or to maintain.

Obviously to be most efficient and economical, a sewage treatment system must be reliable under all conditions, ideally treat the bulk of the solids at each sewage source, be free from clogging through accidental ingestion of non-organic materials, and utilize components having proven reliability. Any components requiring maintainence should be easily accessible and inexpensive to install, operate and maintain. This invention meets those requirements.

This invention is a sewage system composed of a primary settling tank which anaerobically treats collected solids, and a holding tank which optionally is an integral part of the settling tank. The holding tank is on the order of total size of that which would be utilized if a septic tank system were to be installed. All solids, biodegradable or not, are retained within the settling tank for diagenetic decomposition or storage. The liquid overflow from the settling tank, which may also be doubly used to increase storage capacity, flows into a wet well which may either be a segregated integral part of the holding tank or a separate tank. Separated from the corrosive atmosphere of the holding tank and preferably in an area of easy access is an ordinary pump. The pump has an inlet near the bottom of the wet well and an outlet to a small diameter conduit to carry the liquid effluent under pressure to a central treatment system. The pump is to run intermittently, dependent upon the level of the effluent in the wet well or settling tank when the settling tank is used for additional storage. The pump also may be controlled by the pressure in the collection lines to the central treatment facility. Utilizing a multiplicity of such facilities, one at each source, in an interconnected sewage system has several unique advantages over previously available systems.

Each previously utilized central sewage treatment system has been forced to cope with a well known constraint: sewage flow into a system for a residential area is not a constant. There is a period of peak sewage utilization early in the morning, around noon and then in the evening with much lower flow rates at other times. All designs of sewage collection lines must take the peak flows into account in designing the size of lines to be installed, since they must be designed to accommodate the peak flow condition which may exist only a few hours per day. If the flow of sewage into the collecting lines were to be at an even controlled rate throughout a twenty-four hour period, the size of the collecting lines could obviously be reduced. In addition, the treatment plant could also be more fully utilized throughout the twenty-four hour period having a constant loading input. For instance, in a conventional gravity flow sewage system, it has been estimated that two-thirds of the load input comes into the plant in 10% of the time.

An individual wet well provides storage of peak usage inputs and will tend to eliminate the peak flows of sewage through the collection lines, making a more constant average flow. Statistically the more wet wells are connected i.e. the larger the system, the more peaks will be lowered making more constant flow rates into the collection lines since only a small percentage of the pumps will on average be emptying their wet wells at any given time. In addition, if pumping is controlled by the pressure in the collection lines there can be a further dramatic decrease in the size of the collection lines. With adequate wet well storage, the pump need only run a few minutes per day. With a preset maximum pressure in the collection lines the storage capacity in the wet wells can be utilized to allow the individual pumps in the system to operate sequentially which again tends to promote a constant flow rate for maximum utilization of the collection system and treatment plant. For example, in a 25,000 foot system providing service to 720 homes utilizing a 50 gallon wet well, the collection pipe size could range from 12 to 20 inches in diameter. Using a pressure limiter and 300 gallon wet well, the collection system piping required ranges from only 2 to 3 inches in diameter. This of course is for treating an equivalent amount of sewage volume.

Final treatment of the effluent may be accomplished through the use of suitable equipment or plant for chemical or biological treatment, such as an extended aeration aerobic mechanical treatment plant or lagoon. In some instances, no further treatment may be necessary other then bacteriological decontamination or chlorination.

For a more complete understanding of the invention, three embodiments thereof will now be described with reference to the accompanying drawings. Specific language will be utilized to describe these particular embodiments but no limitation upon the scope of the invention is intended thereby, such alterations and modifications to the illustrated embodiment and further applications of the principles of the invention being contemplated as would normally occur to one skilled in the art to which the invention relates.

Referring now particularly to the drawings wherein.

Figure 1:
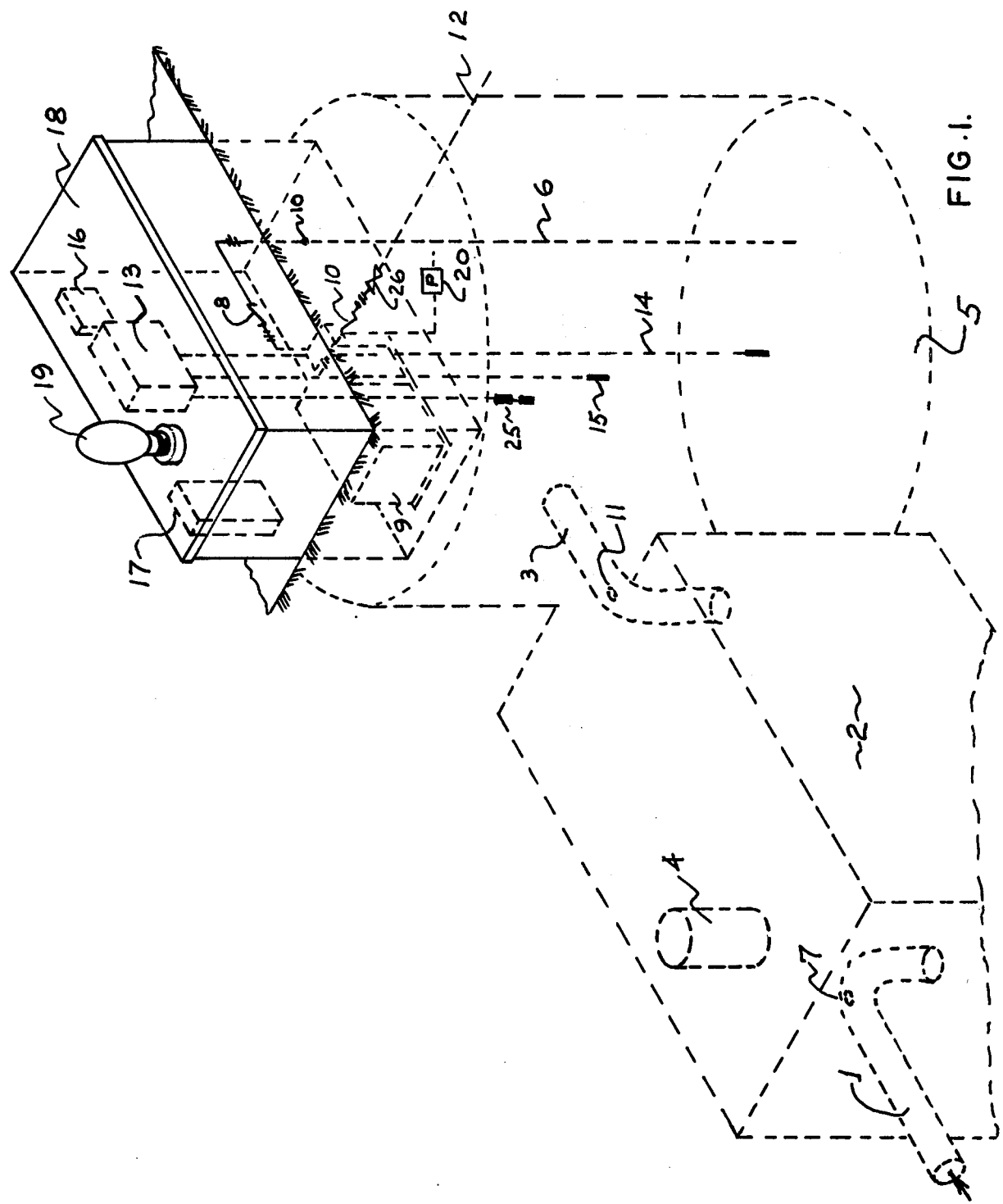
FIG. 1 is one form of the apparatus which is to be located at or near each sewage source such as a residence which utilizes a separate wet well.

FIG. 1 illustrates the apparatus to be located at or near each dwelling unit or convenient gravity collection point for a plurality of sewage inlets. 1 is a sewage inlet through which flows raw sewage, both liquids and solids and other inorganic matter which may accidentally be deposited into the system. Said sewage inlet 1 is a gravity feed non-pressurized line which in the case of a residence, would be approximately four inches in diameter. The higher end of 1 could, of course, be attached to the various sewage inlets in a home, such as a lavatory, sink or drain, while the lower end is connected to a tank 2, referred to as digester herein, which functions as an anaerobic digester and solids trap. The inlet 1 is located near the top of the settling tank and digester 2 and accepts all matter which may flow through the rather large diameter of sewage inlet 1. Inlet 1 enters the settling tank and digester 2 near the top and continues downward toward the bottom of the tank approximately 6 inches lower than the lowest point of the settling tank outlet 3. This is to prevent floating caked scum from clogging inlet 1. In all other embodiments shown herein, the inlet pipe should extend several inches below the lowest point of the liquid level in digester 2. Said inlet 1 includes an air vent hole 7 near the top just inside the digester 2. All solids, except those in suspension, of small size in the sewage are retained in the settling tank for digestion. Anaerobic bacteria gradually decomposes the organic matter which undergoes diagenesis. Inorganic material is also retained in the settling tank through its higher specific gravity than the liquid effluent, thus preventing any opportunity to foul the effluent pump 9. After many years of use it may be necessary to remove accumulated solids and solidified waste and as the digester 2 and wet well 5 will normally be located below ground, and access vent 4 is located on the top of the digester 2 preferably even with the ground surface. The digester 2 will normally be of approximately one thousand gallons in capacity and the normal septic tanks commercially sold will serve quite well.

At the opposite end of the digester 2 from the inlet 1 is a liquid overflow pipe 3, which extends towards the bottom of digester 2, approximately 6 inches from the low point of the opening between the containers 2 and 5, so that floating solids will not pass or clog the overflow pipe 3. Overflow pipe 3 also includes an air vent hole 11 at its top inside digester 2. The liquid overflow at this point is relatively pure as compared to the sewage normally entering a central treatment facility. This purity is a result of early removal of the organic solids and early biological reduction prior to contamination. Thus, a central treatment plant may be much smaller in size than would otherwise be necessary if the solids were intermixed with liquid effluent throughout the period of advance through the collection lines in a gravity system to a central treatment plant. The liquid overflow pipe 3 carries by gravity flow the liquid overflow from the digester to a wet well 5. A wet well is illustrated in FIG. 1 as a separate holding tank, but could mechanically be an integral portion of the digester and settling tank to form a one piece treatment unit. A unit of the type illustrated is most suitable for an area where septic tank fields have failed and the community wishes to convert inexpensively to the process disclosed herein, utilizing the existing septic tanks as a settling tank and digester, merely adding the collection lines, wet well and pump mechanism.

Figure 2:
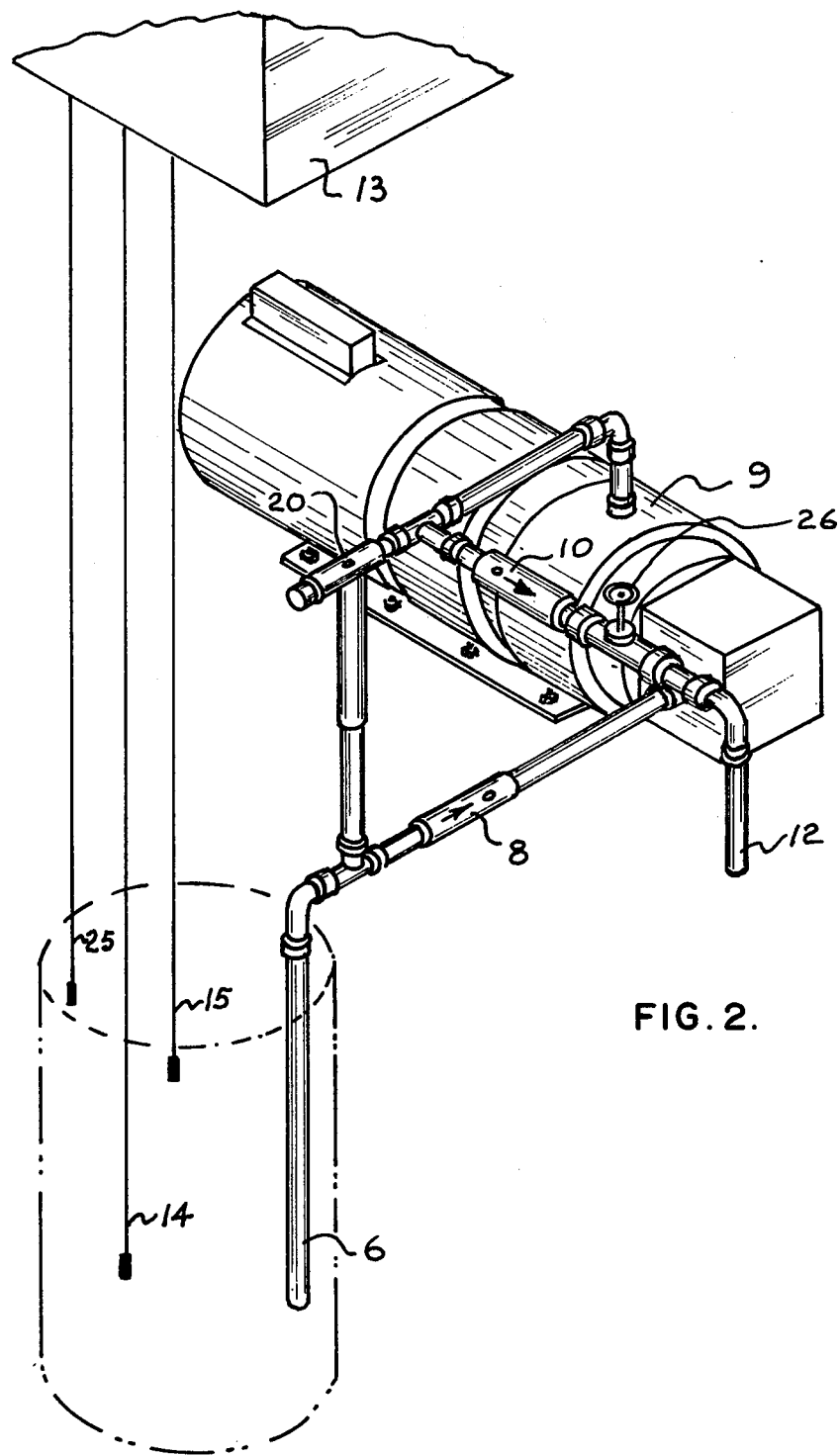
FIG. 2 is an illustration of a typical pumping mechanism, valving and controls utilized in all systems.

Extending vertically into the wet well is the drop pipe 6 which has an inlet somewhere near the bottom of the wet well 5 and an outlet connected to the inlet of pump 9 through a check valve 8 which only allows liquid to flow towards pump 9 and retains it in the pump chamber, while the pump is not operating. Pump 9 and associated valving and controls are detailed in FIG. 2.

Pump 9 is an ordinary pump commercially available from many manufacturers and may be either a jet pump or a positive displacement pump. The pump need not have specially constructed impellers or be so constructed as to enable it to grind solids as these are previously removed in the digester and solids trap 2. Obviously, it also need not be submersible as required of grinder pump systems. Pump 9 is preferably located on top of the wet well in an enclosed housing 18 to protect it as well as the valves from the elements. In colder climates an electric heater 16 may be added to protect the pump from freezing. A visual alarm 19 may be located on the exterior of housing 18, set to operate through the liquid level control 13 upon the liquid level reaching an alarm probe 25, which would trigger the alarm if the liquid level reached alarm probe 25. Pump 9 is controlled in its operation by liquid level control 13 with 14 being the "pump off" liquid control float and 15 being the "pump on" liquid control float. The pump electrical service disconnect is also shown as 17. Although float switches are utilized in this example to indicate control of the pump, it is obvious that any number of systems are available to control electrical apparatus as a function of liquid level.

After liquid waste exits pump 9, it flows through check valve 10 which prevents backflow of the pressurized liquid waste, and then passes through a gate valve 26 to allow removal of the pump and associated equipment and then to a small, one to two inch line under pressure to a trunk line of the central collection system. This system usually completes the treatment of the liquid waste by aerobic bacteriological action such as through the use of a lagoon or extended aeration mechanical treatment facility.

Pressure in the central collecting lines is effectively controlled through the use of a pressure relief valve 20. The relief valve 20 will circulate liquid effluent back through the drop pipe 6 when a preset pressure is exceeded, thus controlling the pressure in the main collection lines 12. It is not necessary to use pressure switches when a non-positive displacement pump is used, since by design, they will be self limiting in pressure without harming the pump. It can readily be seen that there are other ways of controlling the flow within the collection system such as variable pumping rates with corresponding variable pumping heads. Any type of pump system utilized which limits the maximum pressure in the collection lines to the designed maximum effectively accomplishes the thrust of this portion of the invention which is to allow temporary storage within a localized wet well at the sewage source if a set designed pressure in the collection lines is exceeded, thus making it possible to design much smaller collection lines and a more constant flow rate in the collection lines.

Figure 3:
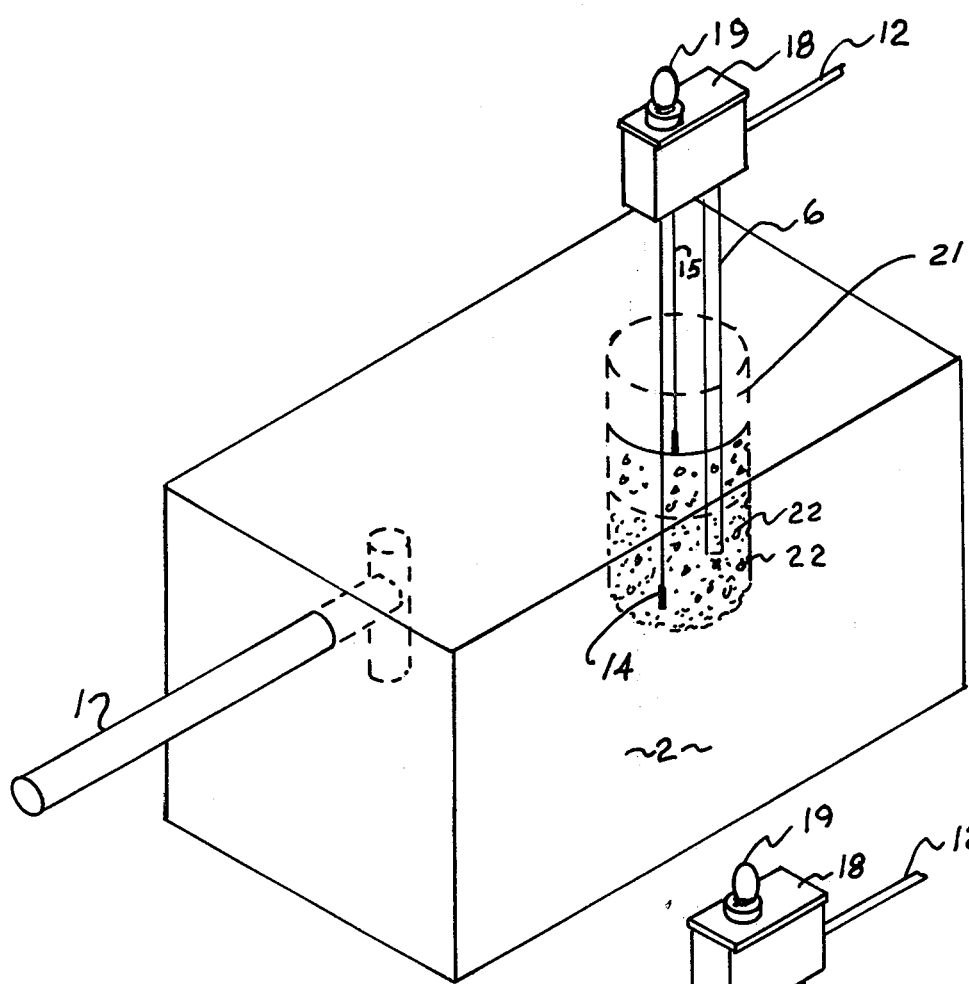
FIG. 3 is another form of the apparatus to be located at or near each sewage source utilizing an integrated wet well and solids trap.

FIG. 3 illustrates the apparatus utilizing one type of an integral wet well. Sewage flows from the source through 1 a gravity feed non-pressurized line. Said line flows into a container 2 which functions as a solids trap and anaerobic digester. Within digester 2 and suspended from its top is an integrated wet well 21 which is a container extending from the top of solids trap and digester 2 to near its bottom having small perforations 22 in its walls which allows liquid and suspended solids to pass from the exterior to the interior of wet well 21. The size of the perforations is not critical except that they should be small enough so that suspended solids which are ingested will not clog draw pipe 6 or pump 9. The wet well 21 should extend from the top of digester 2 downward most of the height of digester 2 but not all the way so that accumulated solids build up in the bottom of digester 2 will not clog the wet well inlet perforations 22. As liquid accumulates in digester 2, it also accumulates at the same level in wet well 21. At a predetermined level, this liquid will activate pump on level control switch 15 which will then activate withdrawal of the liquid effluent through draw pipe 6 out to the central collection line 12. This action will continue until the liquid level in both the wet well and the container 22 are lowered to the position of the pump off liquid level control switch 14. In this manner the upper portion of digester 2 is utilized as a wet well or storage area for liquid effluent without the necessity of a large separate tank as is utilized in FIG. 1.

Figure 4:
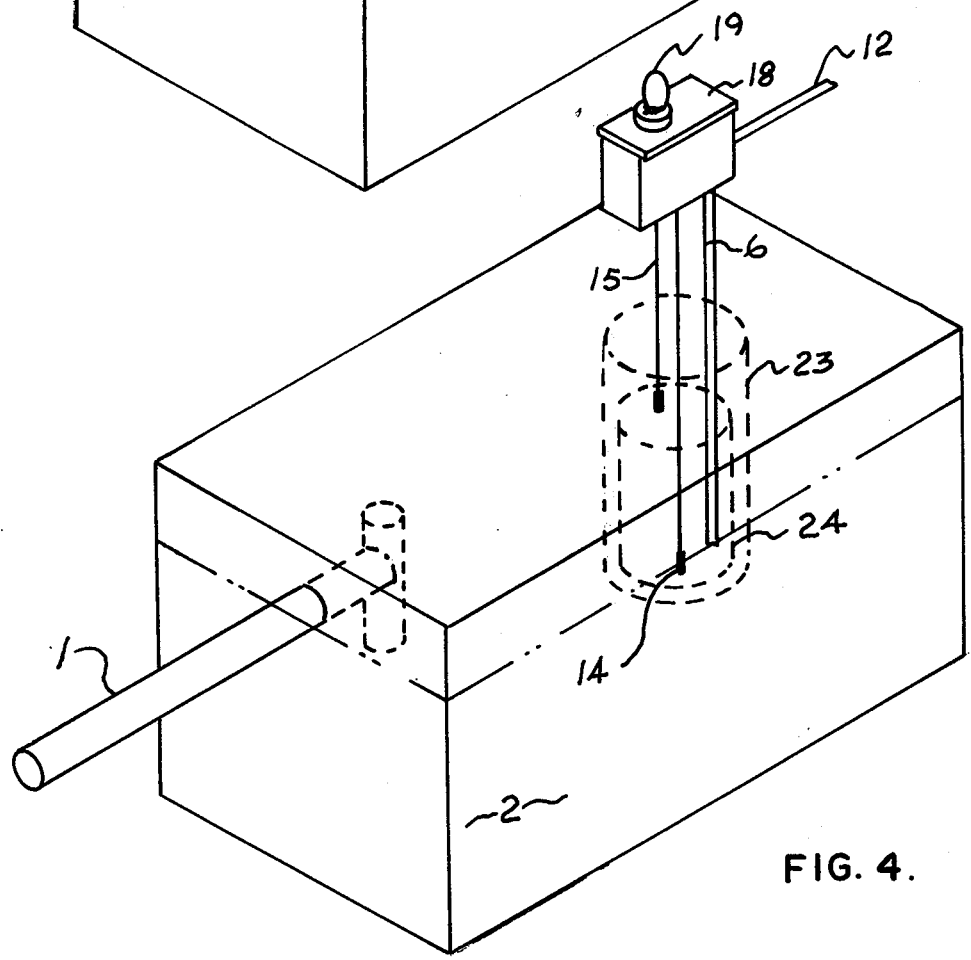
FIG. 4 is yet another form of the apparatus utilizing an integral wet well with another embodiment of the principle of separation of solids from liquid effluent.

FIG. 4 illustrates the apparatus utilizing yet another embodiment of an integral wet well. Sewage flows from the source through 1 a gravity feed non-pressurized line. Said line flows into a container 2 which functions as a solids trap and anaerobic digester. Within digester 2 and suspended from its top is a wet well container 23 having an open bottom and extending about ⅔ of the height of digester 2 so that accumulated solids will not block the flow of liquid effluent through its open end. Suspended within wet well container 23 is another wet well container 24 having one end closed and one open end. The closed end is towards the bottom of digester 2, the open end is toward the top of digester 2 but should be low enough to allow digester 2 to function as an integral wet well for storage of liquid effluent. In operation, solids will be retained and anaerobic decomposition take place on the bottom of digester 2. Liquid effluent will rise in the digester 2 generally and also in the space between wet well containers 23 and 24, spilling over into and filling container 24 which contains within it draw pipe 6. Ultimately, when the liquid level in container 2 reaches 15 the pump on liquid level control pump 9 will remove liquid effluent through draw pipe 6 and out to the central collection line 12. This action will lower the liquid level in container 2 to the top of wet well 24 and within wet well 24 to the pump off liquid level control 14.

It is obvious from the foregoing examples that it is possible to devise many shapes and types of wet wells using baffles within a single container or separate containers of many types. All are contemplated within the scope of this invention so long as they function to separate suspended liquid waste from solid waste and floating waste.

I claim:

1. A method of treating and collecting sewage which comprises:
   a. Collecting sewage in a plurality of containers;
   b. Storing non-biodegradable sewage solids in each container;
   c. Partially decomposing biodegradable solids through diagenetic decomposition in each container to reduce the biodegradable solids in size and alter their specific gravity;
   d. Separating in each container liquid sewage containing suspended solids below a predetermined size from floating, settled and other solids;

e. Accumulating and temporarily storing liquids and suspended solids between predetermined levels in each container;

f. Pumping stored liquids and suspended solids from each container as the liquid reaches the predetermined upper level, using the storage of each container to promote a more even flow rate from a plurality of containers through collection lines interconnecting each container and central final treatment means.

2. The method of treating and collecting sewage of claim 1 wherein a second level of accumulation and storage of liquids and suspended solids is utilized above the first level in each container, in conjunction with pressure means to allow further temporary accumulation in a container until pressure in interconnected collection lines is below a predetermined maximum, thereby further promoting a more even flow rate into the central final treatment means.

3. A sewage treatment and collection system comprising in combination:

a. A plurality of first containers, each having a liquid and solids sewage inlet;

b. A plurality of second containers having perforated walls, each of which is located within a first container so that liquids and suspended solids below a predetermined size are allowed to pass freely between a first container to a second container in order that liquids and suspended solids may be accumulated and stored in both a first and a second container;

c. A plurality of pumps, each pump having an inlet near the bottom of a second container so that liquids and suspended solids below a predetermined size may be drawn from the second container and wherein each pump operates as a function of liquid level in the container from which it pumps;

d. A plurality of one way valves at the outlet of each pump, permitting fluid only to leave the pump;

e. Collection lines, interconnecting each pump outlet, terminating into central final treatment means wherein intermittent operation of each pump as a function of the liquid level in the container from which it pumps, promotes even flow rates in the collection lines.

4. The sewage treatment and collection system of claim 3, wherein each pump's outlet is connected to a recirculating by-pass, using pressure sensing means which senses pressure in the collection lines and diverts liquid flow back to the container from which it was pumped until ambient pressure in the collection lines is reduced below a predetermined maximum, and wherein each first and second container has additional storage capacity above the liquid level at which a pump would commence discharging.

* * * * *